(12) United States Patent
Lin et al.

(10) Patent No.: US 12,237,667 B2
(45) Date of Patent: Feb. 25, 2025

(54) METHOD AND SYSTEM FOR CONTROLLING INTELLIGENT SWITCH CABINET

(71) Applicant: SHANTOU POWER PLANT OF HUANENG (GUANGDONG) ENERGY DEVELOPMENT CO., LTD., Shantou (CN)

(72) Inventors: Junjie Lin, Shantou (CN); Ruirong Qiu, Shantou (CN); Zhexin Wu, Shantou (CN); Xianxian Qiu, Shantou (CN); Maoji Lin, Shantou (CN); Zaoxin Yang, Shantou (CN); Ziguang Wu, Shantou (CN); Qiaopei Chen, Shantou (CN); Lingge Xu, Shantou (CN); Peicong Huang, Shantou (CN); Wubin Lin, Shantou (CN)

(73) Assignee: SHANTOU POWER PLANT OF HUANENG (GUANGDONG) ENERGY DEVELOPMENT CO., LTD., Shantou (CN)

(*) Notice: Subject to any disclaimer, the term of this patent is extended or adjusted under 35 U.S.C. 154(b) by 0 days.

(21) Appl. No.: 18/653,995

(22) Filed: May 3, 2024

(65) Prior Publication Data
US 2025/0015587 A1    Jan. 9, 2025

(30) Foreign Application Priority Data
Jul. 6, 2023    (CN) .......................... 202310831237.3

(51) Int. Cl.
*H02H 7/20* (2006.01)
*H02H 11/00* (2006.01)
*H02J 13/00* (2006.01)

(52) U.S. Cl.
CPC ............ *H02H 7/20* (2013.01); *H02H 11/008* (2013.01); *H02J 13/00* (2013.01)

(58) Field of Classification Search
None
See application file for complete search history.

(56) References Cited

U.S. PATENT DOCUMENTS

| 10,209,753 B2 * | 2/2019 | Li .............................. G06F 1/26 |
| 2013/0024037 A1 | 1/2013 | Jin et al. |
| 2018/0088643 A1 * | 3/2018 | Li ....................... H02J 13/0004 |

FOREIGN PATENT DOCUMENTS

| CN | 101013635 A | 8/2007 | |
| CN | 101206963 A * | 6/2008 | ............... H01H 9/20 |

(Continued)

OTHER PUBLICATIONS

Ni et al., "Research of 220KV Smart Substation Simulation Training System Modeling Method", Applied Mechanics and Materials, Oct. 2013, ISSN: 1662-7482, vol. 437, pp. 880-887. (Year: 2013).*

(Continued)

*Primary Examiner* — Mohammad Ali
*Assistant Examiner* — Kelvin Booker

(57) ABSTRACT

A method and system for controlling an intelligent switch cabinet are provided. The method includes: obtaining running states of a heat engine unit, and performing a matching analysis with a safety measure content of a corresponding heat engine and a DCS marking state, determining first heat engine devices and second heat engine devices; determining a first allowable operation item and a second allowable operation item, determining required operation items in combination with a current actual situation; setting a first work task to an electrical five-prevention system and setting a second work task to an electrical work ticket system, and setting an operation authority to the elements to be operated of the intelligent switch cabinet after the setting is com- (Continued)

pleted; performing the power-off operation on the first heat engine devices of being associated and performing the power-on operation on the second heat engine devices of being associated.

7 Claims, 2 Drawing Sheets

(56) References Cited

FOREIGN PATENT DOCUMENTS

| CN | 201126962 | Y | * | 10/2008 | ............... H02H 7/22 |
|---|---|---|---|---|---|
| CN | 202068235 | U | * | 12/2011 | ............... H02J 13/00 |
| CN | 102508059 | A | | 6/2012 | |
| CN | 203312914 | U | * | 11/2013 | ............... H02J 13/00 |
| CN | 104266641 | A | * | 1/2015 | ............... G01C 21/00 |
| CN | 104281136 | A | * | 1/2015 | ......... G05B 19/4845 |
| CN | 104765395 | A | | 7/2015 | |
| CN | 204464837 | U | * | 7/2015 | ........... H02B 11/167 |
| CN | 105207361 | A | * | 12/2015 | ............... H02J 13/00 |
| CN | 103001318 | B | * | 1/2016 | ............... H02J 13/00 |
| CN | 105515183 | A | * | 4/2016 | ............... H02J 13/00 |
| CN | 105958649 | A | * | 9/2016 | ............... H03K 19/14 |
| CN | 109166209 | A | * | 1/2019 | ......... G07C 9/00722 |
| CN | 209298877 | U | * | 8/2019 | ............... H02H 7/22 |
| CN | 110391602 | A | * | 10/2019 | ............... H01H 3/54 |
| CN | 209805411 | U | * | 12/2019 | ............... H01H 31/04 |
| CN | 113421360 | A | | 9/2021 | |
| CN | 113611014 | A | * | 11/2021 | ............... H04L 9/085 |
| CN | 113964705 | A | * | 1/2022 | ............... H02B 3/00 |
| CN | 114154773 | A | | 3/2022 | |
| CN | 115441345 | A | | 12/2022 | |
| CN | 115459432 | A | | 12/2022 | |
| CN | 218448935 | U | * | 2/2023 | ............... H02B 1/16 |
| CN | 115986936 | A | * | 4/2023 | ............... H02J 13/00 |
| CN | 219226893 | U | * | 6/2023 | ............... H02B 1/16 |

OTHER PUBLICATIONS

Xue et al., "The Information Integration Scheme of Intelligent Substation", 2011, IEEE. (Year: 2011).*
Ren et al., "Design of a Substation Secondary Equipment-Oriented Error Prevention System Using Wireless Communication Technology and Edge Node Cooperation", Mar. 2022, Wireless Communications and Mobile Computing vol. 2022, Article ID 6249549, 12 pages. (Year: 2022).*
Xiong et al., "Study on Application of One Key Sequence Control in 750 kV Substation", 2021 IEEE. (Year: 2021).*
Wang et al., "Research and Application of a New Type of Substation Transportation Inspection Simulation Training System", 2021, Journal of Physics: Conference Series 1802 (2021) 042102. (Year: 2021).*
Li et al., "Research on Development and Design of Maintenance Control System Based on Five-Prevention", 2019, IOP Conf. Series: Earth and Environmental Science 252. (Year: 2019).*
Wang et al., "Research on Intelligent Anti-misoperation Technology Applied to Substation One-button Sequential Control", 2021, 2021 4th International Conference on Advanced Electronic Materials, Computers and Software Engineering (AEMCSE). (Year: 2021).*
Notification to Grant Patent Right for Invention, Chinese Application No. 202310831237.3, mailed Feb. 29, 2024 (3 pages).
CNIPA, Office Action issued for Chinese Application No. 202310831237.3, mailed Jan. 4, 2024 (15 pages).

* cited by examiner

METHOD AND SYSTEM FOR CONTROLLING INTELLIGENT SWITCH CABINET

CROSS-REFERENCE TO RELATED APPLICATIONS

This patent application claims the benefit and priority of Chinese Patent Application No. 202310831237.3, filed on Jul. 6, 2023, the disclosure of which is incorporated by reference herein in its entirety as part of the present application.

TECHNICAL FIELD

The disclosure relates to the field of intelligent control, in particular to a method and system for controlling an intelligent switch cabinet.

BACKGROUND

At present, there are the following processes in the factory power operation of thermal power factory: the unit personnel need to perform power-off and power-on operation for the device due to the implementation or recovery of work ticket measures, and will send a contact sheet of power-off and power-on operation to inform. Electricians give feedback after completing the task to achieve the closed loop of the task. At present, the task management of factory switch cabinet is mainly managed by electricians and electrical five-prevention operation software, which lacks the task correlation of heat engine. Further, electricians and heat engine personnel are relatively separated. If the electricians have insufficient knowledge of the state of heat engine device and poor communication with the heat engine personnel, there may be violations of electrical five-prevention operations, such as entering the charged interval by mistake and closing breaker under load, resulting in device damage and casualties.

Therefore, the disclosure provides a method and system for controlling an intelligent switch cabinet.

SUMMARY

The disclosure provides a method and system for controlling an intelligent switch cabinet. By obtaining the actual information of the intelligent switch cabinet and the corresponding heat engine device, various working conditions can be identified and judged. Based on the judgment result, the intelligent switch cabinet is granted the operation authority, which reduces the probability of device damage and casualties and improves the operation safety of the intelligent switch cabinet.

The disclosure provides a method and system for controlling an intelligent switch cabinet, including:
step 1: obtaining running states of a heat engine unit, and performing a matching analysis with a safety measure content of a corresponding heat engine and a DCS marking state, and determining first heat engine devices for power-off control based on the intelligent switch cabinet and second heat engine devices based on power-on control;
step 2: determining a first allowable operation item based on the power-off control and a second allowable operation item based on the power-on control of the intelligent switch cabinet, and determining required operation items in combination with a current actual situation of elements to be operated in the intelligent switch cabinet;
step 3: setting a first work task to an electrical five-prevention system and setting a second work task to an electrical work ticket system according to heat engine devices of requiring to be controlled related to the heat engine unit, and setting an operation authority to the elements to be operated of the intelligent switch cabinet based on the required operation items after the setting is completed;
step 4: based on the operation authority of being set, performing the power-off operation on the first heat engine devices of being associated and performing the power-on operation on the second heat engine devices of being associated.

In some embodiments, the determining first heat engine devices for power-off control based on the intelligent switch cabinet and second heat engine devices based on power-on control includes:
according to the running states of the heat engine unit of being determined, determining stopped heat engine devices and marking as 0;
obtaining a marking situation of each of the stopped heat engine devices by workers, and marking devices with a marked result as 1 and marking devices without the marked result as 0;
obtaining a safety measure content of each of the stopped heat engine devices, marking a heat engine unit with a power-off safety measure as 1, and marking a heat engine unit with the power-off safety measure of having been solved as 0;
determining the first code of the corresponding device according to all marked results corresponding to a same one of the stopped heat engine devices, and matching with the task condition code to determine a control state of the corresponding device;
regarding devices of a control state of being the power-off control as the first heat engine devices;
regarding devices of a control state of being the power-on control as the second heat engine devices In some embodiments, the determining a first allowable operation item based on the power-off control and a second allowable operation item based on the power-on control of the intelligent switch cabinet, and the determining required operation items in combination with a current actual situation of elements to be operated in the intelligent switch cabinet include:
determining the first allowable operation item corresponding to each of the first heat engine devices in the power-off control, and judging a first current code of the elements to be operated corresponding to each of the first heat engine devices, if a power-off requirement is met, keeping the first current code unchanged, otherwise, adjusting the first current code into a power-off code;
determining the second allowable operation item corresponding to each of the second heat engine devices in the power-on control, and judging a second current code of the elements to be operated corresponding to each of the second heat engine devices, if a power-on requirement is met, keeping the second current code unchanged, otherwise, adjusting the second current code to a power-on code;
obtaining position information of handcarts corresponding to each of the first heat engine devices and each of the second heat engine devices in the intelligent switch cabinet, marking the handcarts in a test position as 1 and marking the handcarts in a working position as 0;

obtaining information of load side grounding breakers corresponding to each of the first heat engine devices and each of the second heat engine devices, and recording a load side grounding breaker of being closed as 1 and recording a load side grounding breaker of being opened as 0;

determining a first item code corresponding to each of the first heat engine devices and a second item code corresponding to each of the second heat engine devices based on recording results;

comparing each operation item code with corresponding a power-off result code and a power-on result code to determine the required operation items of each of the heat engine devices.

In some embodiments, the judging a first current code of the elements to be operated corresponding to each of the first heat engine devices, if a power-off requirement is met, keeping the first current code unchanged, otherwise, adjusting the first current code into a power-off code includes:

determining the first current code of each of the elements to be operated corresponding to each of the first heat engine devices, wherein the elements to be operated comprise a handcart element and the load side grounding breaker in the intelligent switch cabinet;

if a first current code of the handcart element is 1 and/or a first current code of the load side grounding breaker is 1, judging that the power-off requirement is not met, and adjusting the first current code of the handcart element from 1 to 0, and adjusting the first current code of the load side grounding breaker from 1 to 0;

if the first current code of the handcart element is 0 and the first current code of the load side grounding breaker is 0, judging that the power-off requirement is met, and keeping the first current code unchanged.

In some embodiments, the comparing each operation item code with corresponding a power-off result code and a power-on result code to determine the required operation items of each of the heat engine devices includes:

obtaining the first item code of each of the first heat engine devices and the second item code corresponding to each of the second heat engine devices, and calculating the required operation items of each of the heat engine devices based on the power-off result code and the power-on result code:

$$x1_i = p_1 - p_1 \cap P1_i$$

$$x2_j = p_2 - P2_j \cap p_2$$

where i is the first heat engine device and j is the second heat engine device, $x1_i$ is a required operation item code corresponding to an i-th first heat engine device, and $x2_j$ is a required operation item code corresponding to a j-th second heat engine device; $P1_i$ is a first item code corresponding to the i-th first heat engine device, and $P2_j$ is a second item code corresponding to the j-th second heat engine device; $p_1$ represents the power-off result code corresponding to the first heat engine devices; $p_2$ represents the power-on result code corresponding to the second heat engine devices;

if 1 exists in required operation item codes, meaning that an allowable operation item corresponding to code 1 needs to be operated based on the intelligent switch cabinet;

based on the required operation item codes corresponding to each of the first heat engine devices and each of the second heat engine devices, determining the required operation items corresponding to each of the first heat engine devices and each of the second heat engine devices.

In some embodiments, the setting a first work task to an electrical five-prevention system and setting a second work task to an electrical work ticket system according to heat engine devices of requiring to be controlled related to the heat engine unit and setting an operation authority to elements to be operated of the intelligent switch cabinet based on the required operation items includes:

based on the heat engine devices of requiring to be controlled, determining a control content of each of the heat engine devices of requiring to be controlled;

based on the heat engine devices of requiring to be controlled, establishing the first work task to the electrical five-prevention system, and detecting electrical devices corresponding to the heat engine devices;

after the detecting is completed, determining the second work task of the electrical work ticket system corresponding to each of the heat engine devices of requiring to be controlled based on the control content, and adjusting safety measures of an associated auxiliary machine switch and the load side grounding breaker, so as to match an adjustment result with the control content corresponding to each of the heat engine devices;

when the first work task and the second work task are completed, obtaining the required operation items of each of the first heat engine devices and each of the second heat engine devices, and determining the elements to be operated in the intelligent switch cabinet corresponding to each of the required operation items;

granting the operation authority corresponding to the intelligent switch cabinet based on the elements to be operated.

In some embodiments, based on the operation authority of being set, the performing the power-off operation on the first heat engine devices of being associated and performing the power-on operation on the second heat engine devices of being associated includes:

based on the operation authority of the intelligent switch cabinet, determining a first operation content required by the first heat engine devices of being associated and a second operation content required by the second heat engine devices of being associated;

based on the first operation content and the second operation content, controlling the intelligent switch cabinet to perform the power-off operation and the power-on operation.

In some embodiments, a system for controlling an intelligent switch cabinet is provided and includes:

a device determination module: where running states of a heat engine unit are obtained, and a matching analysis is performed with a safety measure content of a corresponding heat engine and a DCS marking state, and first heat engine devices for power-off control based on the intelligent switch cabinet and second heat engine devices based on power-on control are determined;

an operation item determination module: where a first allowable operation item based on the power-off control and a second allowable operation item based on the power-on control of the intelligent switch cabinet are determined, and required operation items are determined in combination with a current actual situation of elements to be operated in the intelligent switch cabinet;

an authority granting module: where a first work task is set to an electrical five-prevention system and a second work task is set to an electrical work ticket system according to heat engine devices of requiring to be controlled related to the heat engine unit, after the setting is completed, and an operation authority is set to the elements to be operated of the intelligent switch cabinet based on the required operation items;

an operation item performing module: where based on the operation authority of being set, the power-off operation is performed on the first heat engine devices of being associated and the power-on operation is performed on the second heat engine devices of being associated.

Other features and advantages of the disclosure will be set forth in the description which follows, and in part will be apparent from the specification, or may be learned by practice of the disclosure. The objects and other advantages of the disclosure may be realized and obtained by the structure particularly pointed out in the written specification and the attached drawings.

In the following, the technical scheme of the disclosure will be further described in detail through the attached drawings and embodiments.

BRIEF DESCRIPTION OF THE DRAWINGS

The attached drawings are provided to provide a further understanding of the disclosure and constitute a part of the specification. Together with the embodiments of the disclosure, they serve to explain the disclosure and do not constitute a limitation of the disclosure. In the attached drawings.

DETAILED DESCRIPTION OF THE EMBODIMENTS

In the following, the preferred embodiments of the disclosure will be described in combination with the accompanying drawings, and it should be understood that the preferred embodiments described here are only used to illustrate and explain the disclosure, and are not used to limit the disclosure.

Embodiment 1

Figure 1:
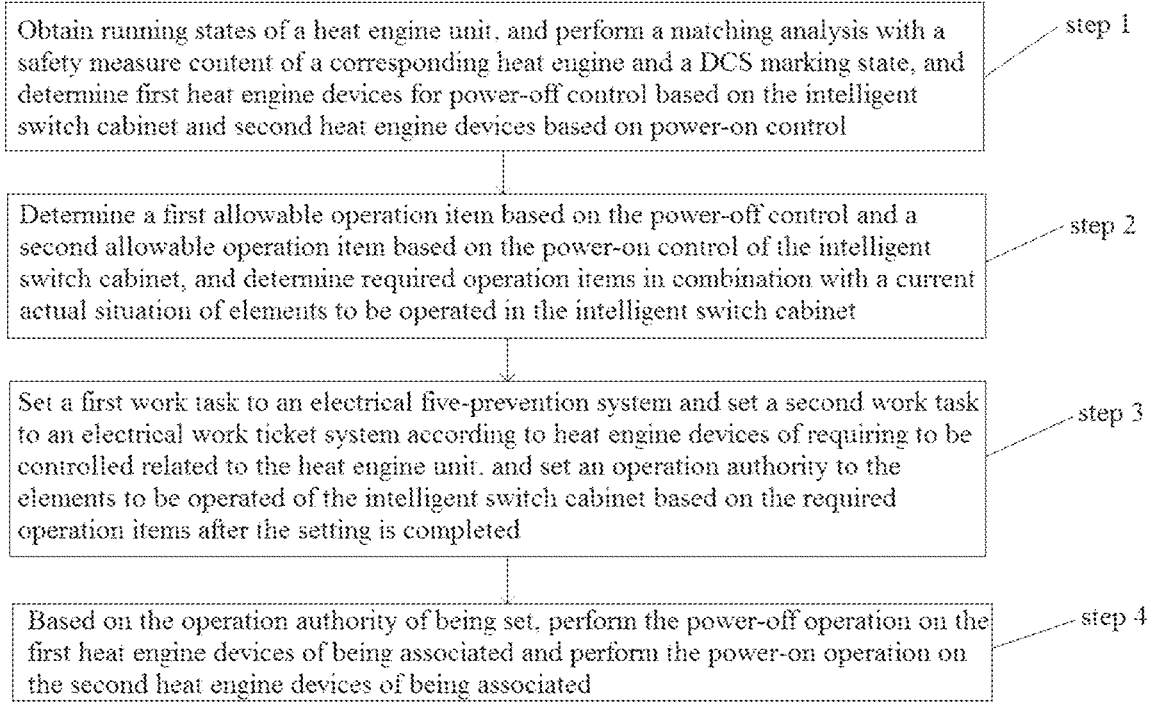
FIG. 1 is a flowchart of a method for controlling an intelligent switch cabinet according to embodiments of the disclosure.
Figure 2:
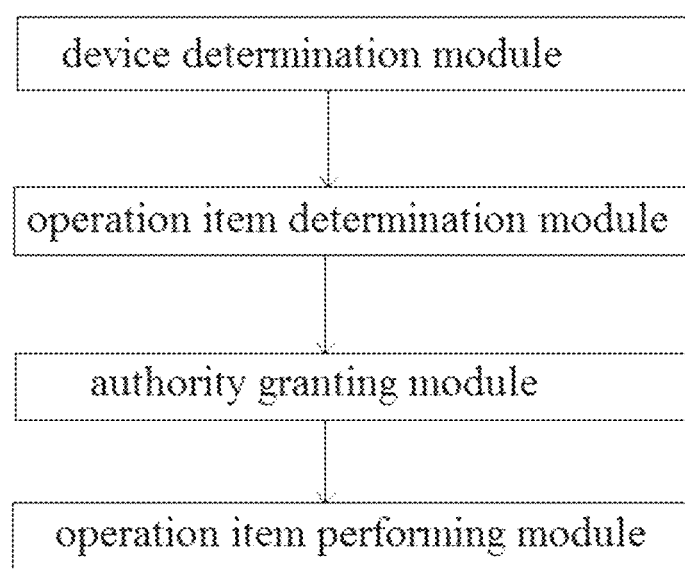
FIG. 2 is a structural diagram of a system for controlling the intelligent switch cabinet according to embodiments of the disclosure.

A method for controlling an intelligent switch cabinet is provided, as shown in FIG. 1, and includes:

step 1: running states of a heat engine unit are obtained, and a matching analysis is performed with a safety measure content of a corresponding heat engine and a DCS marking state, and first heat engine devices for power-off control based on the intelligent switch cabinet and second heat engine devices based on power-on control are determined;

step 2: a first allowable operation item based on the power-off control and a second allowable operation item based on the power-on control of the intelligent switch cabinet are determined, and required operation items are determined in combination with a current actual situation of elements to be operated in the intelligent switch cabinet;

step 3: a first work task is set to an electrical five-prevention system and a second work task is set to an electrical work ticket system according to heat engine devices of requiring to be controlled related to the heat engine unit, and an operation authority is set to the elements to be operated of the intelligent switch cabinet based on the required operation items after the setting is completed;

step 4: based on the operation authority of being set, the power-off operation is performed on the first heat engine devices of being associated and the power-on operation is performed on the second heat engine devices of being associated.

In the embodiment, the running states of the heat engine unit are divided into two states: stopped and not stopped, and the obtained heat engine units corresponding to the first heat engine device and the second heat engine device are stopped heat engine units;

In the embodiment, the first allowable operation item refers to the operation contents required by the intelligent switch cabinet to power off the first heat engine device, such as: when the intelligent switch cabinet powers off the heat engine device 1, it is necessary to change position of the handcart from a working position to a test position and close corresponding load side grounding breaker.

In the embodiment, the second allowable operation item refers to the operation contents required by the intelligent switch cabinet to power off the second heat engine device, such as: when the intelligent switch cabinet powers off the heat engine device 1, it is necessary to change the position of the handcart from the test position to the working position and open the corresponding load side grounding breaker.

In the embodiment, the elements to be operated in the intelligent switch cabinet refer to the elements that require to be operated when the intelligent switch cabinet controls the heat engine device, such as: when the heat engine device 1 is operated, the elements to be operated are the handcart and the load side grounding breaker corresponding to the heat engine device 1 in the intelligent switch cabinet.

In the embodiment, the required operation items refer to: for example, when the power-off control is performed on the heat engine device 1, it is necessary to change the position of the handcart from the working position to the test position, and close the corresponding load side grounding breaker, while the position of the handcart corresponding to the heat engine device 1 is the test position and the breaker is in the open state, then the items to be operated are to close the corresponding load side grounding breaker.

In the embodiment, the second work task of the electrical five-prevention system corresponding to different control contents is the same, which is to detect the electrical device, and preventing disconnection and connection of the isolating switch under load, preventing disconnection and connection of the circuit breaker by mistake, preventing the close of grounding switch under load, preventing the grounding switch from being loaded when it is closed, and preventing from entering the charged interval by mistake are realized.

In the embodiment, the second work task corresponding to different control contents is different. For example, the second work task of power-off control is that the electrical work ticket system has safety measures to close the load side grounding breaker through the associated auxiliary machine switch, and the second work task of power-on control is to remove the safety measures of closing the load side grounding breaker through the associated auxiliary machine switch.

The above technical scheme has the following beneficial effects: the control contents of the stopped heat engine device are confirmed in many aspects, the required operation contents are obtained based on the actual information, and the corresponding working conditions are established to control the heat engine device that meets the conditions, so that the probability of device damage and casualties is reduced, and the operation safety of the intelligent switch cabinet is ensured.

Embodiment 2

A method for controlling an intelligent switch cabinet is provided, the determining first heat engine devices for power-off control based on the intelligent switch cabinet and second heat engine devices based on power-on control includes:

according to the running states of the heat engine unit of being determined, stopped heat engine devices are determined and marked as 0;

a marking situation of each of the stopped heat engine devices is obtained by workers, and devices with the marked result are marked as 1 and devices without the marked result are marked as 0;

a safety measure content of each of the stopped heat engine devices is obtained, a heat engine unit with a power-off safety measure is marked as 1, and a heat engine unit with the power-off safety measure of having been solved is marked as 0;

the first code of the corresponding device is determined according to all marked results corresponding to a same one of the stopped heat engine devices, and is matched with the task condition code to determine a control state of the corresponding device;

devices of a control state of being the power-off control are regarded as the first heat engine devices;

devices of a control state of being the power-on control are regarded as the second heat engine devices.

In the embodiment, the marking situation means that, for example, if there is an artificially mark TAG on the auxiliary machine corresponding to the DCS switch of the heat engine device 1, the recording result of the heat engine device 1 is 1.

In the embodiment, each of the stopped heat engine devices has a corresponding first code, and the first code is: 0 (the heat engine device has been stopped)–0/1 (the heat engine device is marked/the heat engine device is unmarked)–0/1 (the power-off safety measures exist/the power-off safety measures have been solved).

In the embodiment, task code is divided into power-off task code and power-on task code, in which the power-off task code is 011; the power-on task code is 000.

The above technical scheme has the following beneficial effects: the first code is performed based on the actual situation of each of the stopped heat engine devices, and compared with the task condition code, which is beneficial to determine the heat engine devices of requiring to be controlled and the allowable operation items corresponding to each of the heat engine devices of requiring to be controlled.

Embodiment 3

A method for controlling an intelligent switch cabinet is provided, determining a first allowable operation item based on the power-off control and a second allowable operation item based on the power-on control of the intelligent switch cabinet, and determining required operation items in combination with a current actual situation of elements to be operated in the intelligent switch cabinet include:

the first allowable operation item corresponding to each of the first heat engine devices in the power-off control is determined, and a first current code of the elements to be operated corresponding to each of the first heat engine devices is judged, if a power-off requirement is met, the first current code is kept unchanged, otherwise, the first current code is adjusted into a power-off code;

the second allowable operation item corresponding to each of the second heat engine devices in the power-on control is determined, and a second current code of the elements to be operated corresponding to each of the second heat engine devices is judged, if a power-on requirement is met, the second current code is kept unchanged, otherwise, the second current code is adjusted to a power-on code;

position information of handcarts corresponding to each of the first heat engine devices and each of the second heat engine devices in the intelligent switch cabinet is obtained, the handcarts in a test position are marked as 1 and the handcarts in a working position are marked as 0;

information of load side grounding breakers corresponding to each of the first heat engine devices and each of the second heat engine devices is obtained, and a load side grounding breaker of being closed is recorded as 1 and a load side grounding breaker of being opened is recorded as 0;

based on recording results, a first item code corresponding to each of the first heat engine devices and a second item code corresponding to each of the second heat engine devices are determined;

each operation item code is compared with corresponding a power-off result code and a power-on result code to determine the required operation items of each of the heat engine devices.

In the embodiment, if the first allowable operation item, such as the handcart of heat engine device 1 from the working position to the test position, that is, 0→1, and the corresponding first current code is 0, the power-off condition is met and no adjustment is required.

In the embodiment, if the first current task code of the heat engine device 1 is 111, the power-off requirement is not met, the current task code of the heat engine device 1 requires to be adjusted to 100.

In the embodiment, the power-off code is 100 and the power-on code is 211.

In the embodiment, if the heat engine device requires to be powered off, and the position of handcart is the test position and the load side grounding breaker is closed after the power off is completed, the power-off result code is 1 (power-off task)–1 (handcart is in the test position)–1 (the load side grounding breaker is closed).

In the embodiment, the power-on result code is 2 (power-on task)–0 (handcart is in working position)–0 (load side grounding breaker is opened).

In the embodiment, the code rules of the first item code and the second item code are the same, which are: 1/2 (power-off task/power-on task)–0/1 (handcart is in working position/test position) 0/1 (load side grounding breaker is opened/closed).

In the embodiment, if the first item code of the heat engine device 1 is 100, and the power-off result code is 111, it is necessary to change position of the handcart in the intelligent switch cabinet corresponding to the heat engine device 1 and state of the load side grounding breaker.

The above technical scheme has the following beneficial effects: by comparing and adjusting the operation contents and actual conditions of heat engine device, the possibility of accidents of abnormal device is reduced. At the same time, the adjusted actual conditions of heat engine device are coded and compared with the corresponding result codes, which is convenient for confirming the operation contents of each heat engine device and reducing damage probability of the device.

Embodiment 4

A method for controlling an intelligent switch cabinet is provided, judging a first current code of the elements to be operated corresponding to each of the first heat engine devices, if a power-off requirement is met, keeping the first current code unchanged, otherwise, adjusting the first current code into a power-off code include:

the first current code of each of the elements to be operated corresponding to each of the first heat engine devices is determined, where the elements to be operated include a handcart element and the load side grounding breaker in the intelligent switch cabinet;

if a first current code of the handcart element is 1 and/or a first current code of the load side grounding breaker is 1, it is judged that the power-off requirement is not met, and the first current code of the handcart element is adjusted from 1 to 0, and the first current code of the load side grounding breaker is adjusted from 1 to 0;

if the first current code of the handcart element is 0 and the first current code of the load side grounding breaker is 0, it is judged that the power-off requirement is met, and the first current code is kept unchanged;

In the embodiment, if the first current code of the handcart element is 1, the power-off requirement is not met, and it is necessary to adjust 1 to 0, that is, to transfer the handcart element from the test position to the working position;

In the embodiment, if the first current code of handcart element is 0 and the first current code of load side grounding breaker is 0, it is judged that the power-off requirement is met, and the first current code, i.e. 100, is kept unchanged.

The above technical scheme has the following beneficial effects: by judging the current actual situation of the elements to be operated of the heat engine device and the corresponding operation items, the elements to be operated are ensured to be in the working state before the power off, the safety of device and personnel is ensured, and the probability of accidents is reduced.

Embodiment 5

A method for controlling an intelligent switch cabinet is provided, comparing each operation item code with corresponding a power-off result code and a power-on result code to determine the required operation items of each of the heat engine devices includes:

the first item code of each of the first heat engine devices and the second item code corresponding to each of the second heat engine devices are obtained, and the required operation items of each of the heat engine devices are calculated based on the power-off result code and the power-on result code:

$$x1_i = p_1 - p_1 \cap P1_i$$

$$x2_j = p_2 - P2_j \cap p_2$$

where, i is the first heat engine device and j is the second heat engine device, $x1_i$ is a required operation item code corresponding to an i-th first heat engine device, and $x2_j$ is a required operation item code corresponding to a j-th second heat engine device; $P1_i$ is a first item code corresponding to the i-th first heat engine device, and $P2_j$ is a second item code corresponding to the j-th second heat engine device; $p_1$ represents the power-off result code corresponding to the first heat engine devices; $p_2$ represents the power-on result code corresponding to the second heat engine devices;

if 1 exists in required operation item codes, it means that an allowable operation item corresponding to code 1 needs to be operated based on the intelligent switch cabinet;

based on the required operation item codes corresponding to each of the first heat engine devices and each of the second heat engine devices, the required operation items corresponding to each of the first heat engine devices and each of the second heat engine devices are determined.

In the embodiment, $p_1$ is 111, $p_2$ is 200.

In the embodiment, if the required operation item code of the first heat engine device 1, namely $x1_i$, is 010, the intelligent switch cabinet is required to change the handcart position corresponding to the first heat engine device 1.

In the embodiment, the calculation rules are 0−1=1, 1−1=0, and 1−0=1, for example, if $p_2$ is 200 and $P2_j \cap p_2$ is 211, the calculation result is 011.

In the embodiment, if the required operation item code of the second heat engine device 1, namely $x2_j$, is 001, the intelligent switch cabinet needs to change state of the load side grounding breaker corresponding to the second heat engine device 1.

The above technical scheme has the following beneficial effects: by comparing the item codes of each first heat engine device and the second heat engine device with the corresponding result codes, it is beneficial to determine the required operation items of each heat engine device.

Embodiment 6

A method for controlling an intelligent switch cabinet is provided, setting a first work task to an electrical five-prevention system and setting a second work task to an electrical work ticket system according to heat engine devices of requiring to be controlled related to the heat engine unit and setting an operation authority to elements to be operated of the intelligent switch cabinet based on the required operation items include:

based on the heat engine devices of requiring to be controlled, a control content of each of the heat engine devices of requiring to be controlled is determined;

based on the heat engine devices of requiring to be controlled, the first work task is established to the electrical five-prevention system, and electrical devices corresponding to the heat engine devices are detected;

after the detecting is completed, the second work task of the electrical work ticket system corresponding to each of the heat engine devices of requiring to be controlled is determined based on the control content, and safety measures of an associated auxiliary machine switch and the load side grounding breaker are adjusted, so as to match an adjustment result with the control content corresponding to each of the heat engine devices;

when the first work task and the second work task are completed, the required operation items of each of the first heat engine devices and each of the second heat engine devices are obtained, and the elements to be operated in the intelligent switch cabinet corresponding to each of the required operation items are determined;

the operation authority corresponding to the intelligent switch cabinet is granted based on the elements to be operated.

In the embodiment, the first work tasks of the heat engine device of requiring to be controlled are the same, and the following can be realized through the electrical five-prevention system: preventing disconnection and connection of the isolating switch under load, preventing disconnection and connection of the circuit breaker by mistake, preventing the close of grounding switch under load, preventing the grounding switch from being loaded when it is closed, and preventing from entering the charged interval by mistake.

In the embodiment, the second work tasks corresponding to different control contents are different. For example, the second work task corresponding to power-on control is to disassociate the safety measures of the associated auxiliary machine switch and load side grounding breaker, and the second work task corresponding to power-off control is to establish the safety measures of associated auxiliary machine switch and load side grounding breaker.

The above technical scheme has the following beneficial effects: by establishing corresponding work tasks for the heat engine device of requiring to be controlled, the safety of electrical device is ensured, the accident probability is reduced, and casualties are avoided.

Embodiment 7

A method for controlling an intelligent switch cabinet is provided, based on the operation authority of being set, performing the power-off operation on the first heat engine devices of being associated and performing the power-on operation on the second heat engine devices of being associated include:

based on the operation authority of the intelligent switch cabinet, a first operation content required by the first heat engine devices of being associated and a second operation content required by the second heat engine devices of being associated are determined;

based on the first operation content and the second operation content, the intelligent switch cabinet is controlled to perform the power-off operation and the power-on operation.

The above technical scheme has the following beneficial effects: based on the authority of the intelligent switch cabinet, power-off operation and power-on operation are performed to ensure smooth operation and reduce the probability of accidents.

Embodiment 8

A system for controlling an intelligent switch cabinet is provided, and includes:

a device determination module: where running states of a heat engine unit are obtained, and a matching analysis is performed with a safety measure content of a corresponding heat engine and a DCS marking state, and first heat engine devices for power-off control based on the intelligent switch cabinet and second heat engine devices based on power-on control are determined;

an operation item determination module: where a first allowable operation item based on the power-off control and a second allowable operation item based on the power-on control of the intelligent switch cabinet are determined, and required operation items are determined in combination with a current actual situation of elements to be operated in the intelligent switch cabinet;

an authority granting module: where a first work task is set to an electrical five-prevention system and a second work task is set to an electrical work ticket system according to heat engine devices of requiring to be controlled related to the heat engine unit, after the setting is completed, and an operation authority is set to the elements to be operated of the intelligent switch cabinet based on the required operation items;

an operation item performing module: where based on the operation authority of being set, the power-off operation is performed on the first heat engine devices of being associated and the power-on operation is performed on the second heat engine devices of being associated.

The above technical scheme has the following beneficial effects: the control content of the stopped heat engine device is confirmed in many aspects, and the required operation content is obtained based on the actual information, and the corresponding working conditions are set up to control the heat engine device that meets the conditions, so that the probability of device damage and casualties is reduced, and the operation safety of the intelligent switch cabinet is ensured.

Apparently, those skilled in the art can make various amendments and variations to the disclosure without departing from the spirit and scope of the disclosure. Thus, if these amendments and variations of the disclosure are within the scope of the claims of the disclosure and their equivalents, the disclosure is also intended to include these amendments and variations.

What is claimed is:

1. A method for controlling an intelligent switch cabinet, wherein comprises:

step 1: obtaining running states of a heat engine unit, and determining a first code of a corresponding device in combination with a safety measure content of a corresponding heat engine and a DCS marking state, so as to perform a matching analysis with a task condition code, and determining first heat engine devices for power-off control based on the intelligent switch cabinet and second heat engine devices based on power-on control;

step 2: determining a first allowable operation item based on the power-off control and a second allowable operation item based on the power-on control of the intelligent switch cabinet, and determining required operation items in combination with a current actual situation of elements to be operated in the intelligent switch cabinet;

step 3: setting a first work task to an electrical five-prevention system and setting a second work task to an electrical work ticket system according to heat engine devices of requiring to be controlled related to the heat engine unit, and setting an operation authority to the elements to be operated of the intelligent switch cabinet based on the required operation items after the setting is completed;

step 4: based on the operation authority of being set, performing the power-off operation on the first heat engine devices of being associated and performing the power-on operation on the second heat engine devices of being associated;

wherein the step 2 comprises:

determining the first allowable operation item corresponding to each of the first heat engine devices in the power-off control, and judging a first current code of the elements to be operated corresponding to each of the first heat engine devices, if a power-off requirement is met, keeping the first current code unchanged, otherwise, adjusting the first current code into a power-off code;

determining the second allowable operation item corresponding to each of the second heat engine devices in the power-on control, and judging a second current code of the elements to be operated corresponding to each of the second heat engine devices, if a power-on requirement is met, keeping the second current code unchanged, otherwise, adjusting the second current code to a power-on code;

obtaining position information of handcarts corresponding to each of the first heat engine devices and each of the second heat engine devices in the intelligent switch cabinet, marking the handcarts in a test position as 1 and marking the handcarts in a working position as 0;

obtaining information of load side grounding breakers corresponding to each of the first heat engine devices and each of the second heat engine devices, and recording a load side grounding breaker of being closed as 1 and recording a load side grounding breaker of being opened as 0;

determining a first item code corresponding to each of the first heat engine devices and a second item code corresponding to each of the second heat engine devices based on recording results;

comparing each operation item code with corresponding a power-off result code and a power-on result code to determine the required operation items of each of the heat engine devices.

2. The method according to claim 1, wherein the determining first heat engine devices for power-off control based on the intelligent switch cabinet and second heat engine devices based on power-on control comprises:

according to the running states of the heat engine unit of being determined, determining stopped heat engine devices and marking as 0;

obtaining a marking situation of each of the stopped heat engine devices by workers, and marking devices with an artificial mark TAG as 1 and marking devices without the artificial mark TAG as 0;

obtaining a safety measure content of each of the stopped heat engine devices, marking a heat engine unit with a power-off safety measure as 1, and marking a heat engine unit with the power-off safety measure of having been solved as 0;

determining the first code of the corresponding device according to all marked results corresponding to a same one of the stopped heat engine devices, and matching with the task condition code to determine a control state of the corresponding device;

regarding devices of a control state of being the power-off control as the first heat engine devices;

regarding devices of a control state of being the power-on control as the second heat engine devices.

3. The method according to claim 1, wherein the judging a first current code of the elements to be operated corresponding to each of the first heat engine devices, if a power-off requirement is met, keeping the first current code unchanged, otherwise, adjusting the first current code into a power-off code comprise:

determining the first current code of each of the elements to be operated corresponding to each of the first heat engine devices, wherein the elements to be operated comprise a handcart element and the load side grounding breaker in the intelligent switch cabinet;

if a first current code of the handcart element is 1 and/or a first current code of the load side grounding breaker is 1, judging that the power-off requirement is not met, and adjusting the first current code of the handcart element from 1 to 0, and adjusting the first current code of the load side grounding breaker from 1 to 0;

if the first current code of the handcart element is 0 and the first current code of the load side grounding breaker is 0, judging that the power-off requirement is met, and keeping the first current code unchanged.

4. The method according to claim 1, wherein the comparing each operation item code with corresponding a power-off result code and a power-on result code to determine the required operation items of each of the heat engine devices comprises:

obtaining the first item code of each of the first heat engine devices and the second item code corresponding to each of the second heat engine devices, and calculating the required operation items of each of the heat engine devices based on the power-off result code and the power-on result code;

$$x1_i = p_1 - p_1 \cap P1_i$$

$$x2_j = p_2 - P2_j \cap p_2$$

wherein $x1_i$ is a required operation item code corresponding to an i-th first heat engine device, and $x2_j$ is a required operation item code corresponding to a j-th second heat engine device; $P1_i$ is a first item code corresponding to the i-th first heat engine device, and $P2_j$ is a second item code corresponding to the j-th second heat engine device; $p_1$ represents the power-off result code corresponding to the first heat engine devices; $p_2$ represents the power-on result code corresponding to the second heat engine devices;

if 1 exists in required operation item codes, meaning that an allowable operation item corresponding to code 1 needs to be operated based on the intelligent switch cabinet;

based on the required operation item codes corresponding to each of the first heat engine devices and each of the second heat engine devices, determining the required operation items corresponding to each of the first heat engine devices and each of the second heat engine devices.

5. The method according to claim 1, wherein the setting a first work task to an electrical five-prevention system and setting a second work task to an electrical work ticket system according to heat engine devices of requiring to be controlled related to the heat engine unit and setting an operation authority to elements to be operated of the intelligent switch cabinet based on the required operation items comprise:

based on the heat engine devices of requiring to be controlled, determining a control content of each of the heat engine devices of requiring to be controlled;

based on the heat engine devices of requiring to be controlled, establishing the first work task to the electrical five-prevention system, and detecting electrical devices corresponding to the heat engine devices;

after the detecting is completed, determining the second work task of the electrical work ticket system corresponding to each of the heat engine devices of requiring to be controlled based on the control content, and adjusting safety measures of an associated auxiliary machine switch and the load side grounding breaker, so as to match an adjustment result with the control content corresponding to each of the heat engine devices;

when the first work task and the second work task are completed, obtaining the required operation items of each of the first heat engine devices and each of the second heat engine devices, and determining the elements to be operated in the intelligent switch cabinet corresponding to each of the required operation items;

granting the operation authority corresponding to the intelligent switch cabinet based on the elements to be operated.

6. The method according to claim 1, wherein based on the operation authority of being set, the performing the power-off operation on the first heat engine devices of being associated and performing the power-on operation on the second heat engine devices of being associated comprise:

based on the operation authority of the intelligent switch cabinet, determining a first operation content required by the first heat engine devices of being associated and a second operation content required by the second heat engine devices of being associated;

based on the first operation content and the second operation content, controlling the intelligent switch cabinet to perform the power-off operation and the power-on operation.

7. A system for controlling an intelligent switch cabinet, wherein comprises:

a device determination module: wherein running states of a heat engine unit are obtained, and a first code of a corresponding device is determined in combination with a safety measure content of a corresponding heat engine and a DCS marking state, so as to perform a matching analysis with a task condition code, and first heat engine devices for power-off control based on the intelligent switch cabinet and second heat engine devices based on power-on control are determined;

an operation item determination module: wherein a first allowable operation item based on the power-off control and a second allowable operation item based on the power-on control of the intelligent switch cabinet are determined, and required operation items are determined in combination with a current actual situation of elements to be operated in the intelligent switch cabinet;

an authority granting module: wherein a first work task is set to an electrical five-prevention system and a second work task is set to an electrical work ticket system according to heat engine devices of requiring to be controlled related to the heat engine unit, after the setting is completed, and an operation authority is set to the elements to be operated of the intelligent switch cabinet based on the required operation items;

an operation item performing module: wherein based on the operation authority of being set, the power-off operation is performed on the first heat engine devices of being associated and the power-on operation is performed on the second heat engine devices of being associated;

wherein the operation item determination module is configured to:

determine the first allowable operation item corresponding to each of the first heat engine devices in the power-off control, and judge a first current code of the elements to be operated corresponding to each of the first heat engine devices, if a power-off requirement is met, the first current code is kept unchanged, otherwise, the first current code is adjusted into a power-off code;

determine the second allowable operation item corresponding to each of the second heat engine devices in the power-on control, and judge a second current code of the elements to be operated corresponding to each of the second heat engine devices, if a power-on requirement is met, the second current code is kept unchanged, otherwise, the second current code is adjusted to a power-on code;

obtain position information of handcarts corresponding to each of the first heat engine devices and each of the second heat engine devices in the intelligent switch cabinet, the handcarts in a test position are marked as 1 and the handcarts in a working position are marked as 0;

obtain information of load side grounding breakers corresponding to each of the first heat engine devices and each of the second heat engine devices, and a load side grounding breaker of being closed is recorded as 1 and a load side grounding breaker of being opened is recorded as 0;

determine a first item code corresponding to each of the first heat engine devices and a second item code corresponding to each of the second heat engine devices based on recording results;

compare each operation item code with corresponding a power-off result code and a power-on result code to determine the required operation items of each of the heat engine devices.

* * * * *